April 24, 1956  F. K. BAGBY  2,742,829
PORTABLE CONTINUOUS METAL MEMBRANE
AIRFIELD SURFACING AND SUBSEAL
Filed Dec. 14, 1951
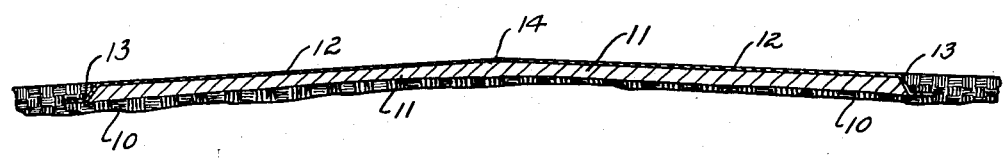
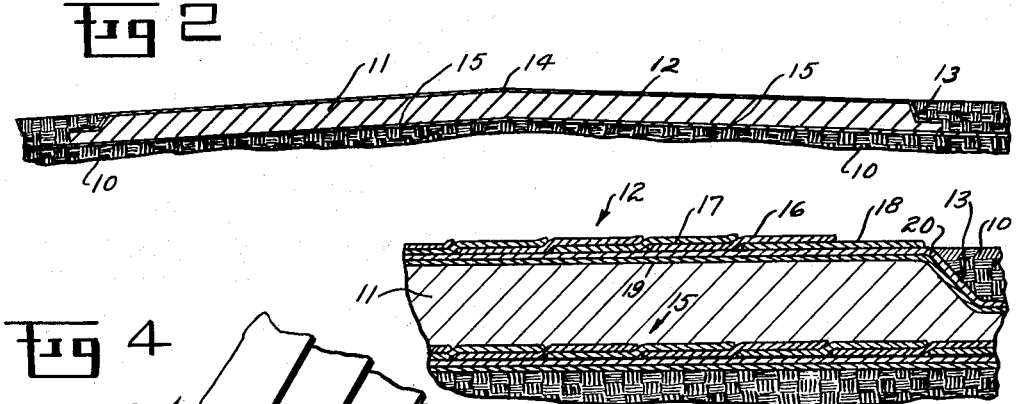
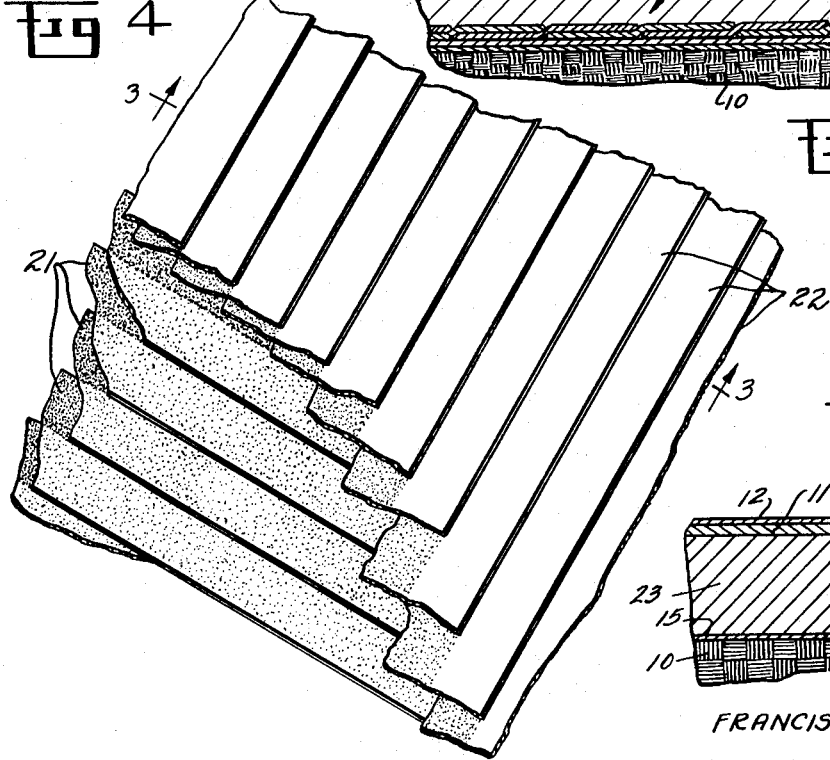
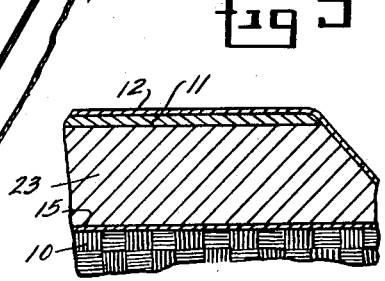
INVENTOR.
FRANCIS K. BAGBY
BY
ATTORNEYS

United States Patent Office 2,742,829
Patented Apr. 24, 1956

2,742,829

PORTABLE CONTINUOUS METAL MEMBRANE AIRFIELD SURFACING AND SUBSEAL

Francis K. Bagby, Fort Walton, Fla., assignor to the United States of America as represented by the Secretary of the Air Force Application December 14, 1951, Serial No. 261,735

7 Claims. (Cl. 94—4)

(Granted under Title 35, U. S. Code (1952), sec. 266)

The invention described herein may be manufactured and used by or for the Government for governmental purposes without the payment of any royalty thereon.

This invention relates to a portable continuous metal membrane airfield surfacing and subsurface seal for runways, taxiways, marshaling areas, aircraft parking aprons, and other aircraft traffic areas, even those which have been paved previously. The latter are thereby made impermeable to fuel spillage which might otherwise damage them and serve to protect same from the damaging effect of the blast from jet engines.

The military services, particularly the United States Air Force, has a requirement for an improved means of rapidly surfacing areas of the kind mentioned. Often, time does not permit the construction of permanent or semi-permanent surfacings, such as bituminous or Portland cement concrete, used for the construction of rear area or zone of interior airfields. Also, it is frequently the case that transportation facilities are inadequate to transport to or within the theater of operations the large tonnages of materials normally required for such surfacings. This is particularly true in the case of transportation of surfacing material to the locations where the construction of military airstrips are to be made.

Since World War I, a number of portable airfield surfacings have been developed, several of which were employed in theaters of operations in World War II; however, each is deficient due to one or more of the following factors:

1. Excessive weight.
2. Excessive shipping volume.
3. Does not waterproof the soil on which laid.
4. Does not dustproof the soil on which laid.
5. Is not resistant to solvent action of aircraft fuels, particularly those of low volatility.
6. Is seriously affected by the heat resulting from jet or rocket engine blast.
7. Does not adequately resist the horizontal stresses induced by the aircraft landing gear incident to touchdown of the aircraft on landing, or braking, turning or skidding of the aircraft.
8. Causes excessive wear of or damage to aircraft tires.
9. Flammable.
10. Excessive rolling resistance to aircraft movement thereon.
11. Difficult or impossible to lay at or beyond certain temperature limits.
12. Excessive time required to lay.
13. Difficult to transport in bulk quantities.

The type and principle of surfacing covered by this invention has a minimum of the above deficiencies.

Briefly stated, the invention comprises a paving construction in which sheet metal, approximately 0.015 to 0.125 inch thick, which is preferably used in rolled strip form and is laid by unrolling over a leveled earth surface which is previously coated with a bituminous layer which may be bituminous concrete. In a modification of the invention, a bituminous layer is spread over the metal layer which has been laid as described, a second metal layer being then laid by unrolling over the bituminous-layer-covered first metal layer so that there is approximately a right-angle between the strips of the two metal layers. There is a four to six inch overlap between the metal strips of each layer. The strips may or may not be riveted or welded to adjacent strips with which they overlap.

The general object of this invention is to provide an easily applied, readily portable means of rapidly surfacing airfield runways and other surfaces from or on which aircraft must operate or park, and at the same time waterproof and dustproof the soil foundation on which laid.

Another object of this invention is to provide a means of flexibly sealing the subsurface beneath airfield or road base courses, irrespective of the type surfacings thereon, to protect against destruction or deterioration of the supporting power of the base course from capillary action, percolation upward of subsurface water or solvent action of spilled fuels.

This invention does not relate to the engineering design of subgrades or base courses surfaced or subsealed or the drainage or other engineering features incident to airfield construction, including the geometrical pattern or configuration of the surfaced or subsealed areas; however, due to the fact that this is an extremely thin and flexible type surfacing, it is mandatory that the base course and/or subgrade on which the surfacing is laid must be so designed as to be capable of, and maintain the capability of, supporting the traffic or the parking of the aircraft to be accommodated.

This invention is not restricted as to identity of metal used for the surface or subseal except as expressed in the appended claims; however, aluminum is ideally suited for the purpose due to its physical characteristics, one of which, besides its lightness, is the ability to resist corrosion without special treatment of the surfaces of the rolled sheeting used. Whatever metal is used, it lies within the scope of the invention to protect it with any of the conventional coatings.

This invention pertains primarily to military airfields, but is not restricted entirely to airfields. The surfacing is adaptable to emergency or other roads for vehicular traffic and the subseal is applicable to many types of airfield and road construction which require a subsurface seal against capillary action or percolation upward of subsurface water, irrespective of the type traffic surfacing used.

These and such other objects as may hereinafter appear are attained by the embodiments of the invention disclosed in the accompanying drawings wherein:

Figure 1 is a cross-section of an airfield or road laid with that form of surfacing in which only one layer of metal is employed.

Figure 2 corresponds to Figure 1 except that two layers of metal are employed.

Figure 3 is an enlarged cross-section of the edge of an airfield or road transverse of the landing strip or road ribbon, showing one form of the construction used for overlap and shoulders.

Figure 4 is a perspective view of a detail of an airfield showing a modified overlap construction, from a high point somewhat to the side of the surfacing.

Figure 5 is a detail of a construction somewhat similar to Figure 3 except that a base course of optimum moisture content for load supporting purposes is held between two metallic membranes so that it cannot alter its water content substantially.

In Figures 1, 2, and 3, 10 is the graded or leveled soil, plus such fills of macadam, gravel, or asphaltic concrete as are necessary to maintain the selected grade. Above this grade is a coarser layer of bituminous paving composition 11, which may be asphalt only, asphalt plus sand, asphaltic concrete or any conventional asphaltic paving material. In Figure 1 the top surface 12 is either a single or double layer in each course of sheet metal, which metal is approximately 0.015 to 0.125 inch thick. At the shoulders 13 of the metallic surfacing material, the sheet metal is turned down to a substantial degree to seal in the bituminous material 11, and to prevent ingress of water. Over the shoulder 13 so formed, a substantial amount of earth fill, macadam bitumen or the like is covered so as to make its top surface flush with the main top surface of the metal. It is preferred to crown for drainage purposes the top surface of the airfield or road, the high point of the crown being 14.

Referring now to Figure 2, there is the difference from Figure 1 that there is a first course 15 of sheet metal in addition to a second or top course 12, the bituminous filling 11 of from 1/32" to 1½" thickness being contained between the two metallic courses. The word "course" is intended to be generic to either a single thin flexible metallic membrane layer of metal strips or a composite one comprising superimposed layers of metallic strips laid to overlap each other over meeting edges or cracks of the lower layer. The degree of overlap should be from four to six inches. The construction shown in Figure 2 is preferred over that of Figure 1 for the reason that, while flexible, the composite paving is not liable to be sharply bent and, therefore, perhaps ruptured.

In Figure 3, there is shown the kind of overlap which is preferred. It is to be understood that the term "overlap" covers not only the kind shown in Figure 3, but that kind in which each sheet stays in a single plane. In Figure 3, each strip or sheet of the top layers is overlapped by its left-hand neighboring sheet 17 and overlaps its right-hand neighbor 18. This is true for the upper layers of either the top course 12 or the bottom course 15, but a different kind of overlap may be used for the bottom course 15 than is used for the top course 12. Besides the kind of overlap just mentioned, there may be utilized as a base layer in both courses 12 and 15, the crosswise disposed strips 19 and 20. Either one or both of these last mentioned strips may be omitted. It is of the essence of the invention, however, that the top strips in all modifications be laid substantially parallel with the center line of the airfield, roadway, etc.

Referring now to Figure 4, the surfacing consists of crosswise disposed strips 21 and lengthwise disposed strips 22, with bituminous material (shown by stippled surfaces) between the layers. The overlap of both strips is of the kind shown in Figure 3. In Figure 4 the strips 21 are overlapped with each other; in Figure 3, the top strips 16, 17 and 18 unquestionably are; the bottom strips 19 and 20 may or may not be since it cannot be so indicated in that figure. Figure 4 illustrates a construction which is quite strong, so that the heavier types of aircraft may utilize fields so built.

Referring now to Figure 5, 10 is the leveled subgrade, over which an edge sealed metal membrane 15, comprising foil strips, has been laid. Over the membrane 15 there is a comparatively thick base course 23, the thickness of which may range from 4 to 36 inches. The base course may consist of sand-clay mixture, or sand-clay-gravel mixture, or sand alone, or clay alone, or caliche alone, or any combination of these with each other, each with an optimum moisture content at which the load-bearing capacity is at a maximum. The special aim of the construction shown in Figure 5 is to preserve the optimum moisture content, so that additional moisture is neither picked up from above or below the base course nor lost from it due to the base course being sealed between the upper and lower courses.

Above the base course 23 there is a sealing layer 11 of bitumen or other sealer, the thickness of which may range from 1/32" to 1½". Any conventional bituminous paving or sealing material (not necessarily bituminous so long as it is waterproof) is suitable for layer or course 11. Above the course 11 there is a metallic membrane 12 composed of foil strips, preferably edge sealed. The membrane 12 may be the same as that shown and described in Figures 1, 2 and 3. The edge of the air field or road laid in this fashion is provided with a shoulder 13 such as shown in the first three figures. Optimum moisture will be too tightly held by the base course material between the membranes 12 and 15 to undergo any serious drying out from evaporation at the shoulders 13. Consequently a stabilized construction making full use of available natural materials from the site itself, has been provided.

I claim:

1. An aircraft landing field comprising a first layer of thin impervious flexible long moisture proof strips placed on a prepared supporting subgrade with their longitudinal edges disposed in overlapping parallel sealed relation, to provide a substantially moisture impervious continuous membrane cover over the said subgrade, a smooth continuous base course of substantial thickness including an earthy mixture of sand-clay characteristics having an optimum moisture content to provide a smooth continuous substantial load sustaning body of substantially uniform thickness, disposed on said first continuous membrane layer to provide a smooth second load supporting surface spaced above the said first membrane layer, a second or upper continuous metallic membrane layer comprising a plurality of thin flexible long metallic impervious strips disposed over said base course with their longitudinal edges disposed in sealed overlapping parallel relation to form a final flexible metallic moisture impervious aircraft landing surface over the top of the base course for aircrafts to land on and take off from and prevent the escape of the optimum moisture content of said base course in which the overlapping portions of the strips are secured together by a flexible cementitious material such as a bituminous material including a bituminous moisture-proof sealing layer spread uniformly over the upper surface of the base course, with the upper metallic strips disposed on the upper surface of the bituminous layer, with the bituminous layer retaining the upper metallic membrane in position with their said edges in said overlapping relation, and a thin sealing layer of cementitious bituminous material interposed between said overlapping edges of the upper metallic strips to retain the said edges in said overlapping relation and prevent moisture ingress or escape between the upper flexible metallic membrane and the base course.

2. An aircraft landing field comprising a first layer of thin impervious flexible long moisture proof strips placed on a prepared supporting subgrade with their longitudinal edges disposed in overlapping parallel sealed relation, to provide a substantially moisture impervious continuous membrane cover over the said subgrade, a smooth continuous base course of substantial thickness including an earthy mixture of sand-clay characteristics having an optimum moisture content to provide a smooth continuous substantial load sustaining body of substantially uniform thickness, disposed on said first continuous membrane layer to provide a smooth second load supporting surface spaced above the said first membrane layer, a second or upper continuous metallic membrane layer comprising a plurality of thin flexible long metallic impervious strips disposed over said base course with their longitudinal edges disposed in sealed overlapping parallel relation to form a final flexible metallic moisture impervious aircraft landing surface over the top of the base course for aircraft to land on and take off from and prevent the escape of the optimum moisture content of said base course, in which the overlapping portions of the strips are secured together by a flexible cementitious material such as a bituminous material, including a cementitious bituminous binder between the upper and lower membrane courses and the base course to prevent the escape of the said optimum moisture content of the base course at the perimeter of upper and lower layers.

3. Structure as claimed in claim 1, in which the overlapping edges of the strip of the upper metallic flexible membrane layer of the landing field are disposed in parallel relation to the intended landing and take off directions of aircraft using the landing field.

4. Structure as claimed in claim 3 in which the lower membrane comprises flexible long thin metallic strips forming a thin metallic layer positioned with their overlapping edges perpendicular to the overlapping edges of the strips of the upper metallic layer.

5. Structure as claimed in claim 3 in which the long metallic strips are composed of a flexible thin sheet material having a uniform thickness of between 0.015 and 0.125 inch in thickness and said base course of optimum moisture content, has a thickness between the upper and the lower metallic layers of between 6" and 36" in thickness.

6. An aircraft landing runway comprising, a moisture impervious substantially uniform thin smooth flexible upper metallic landing surface composed of elongated flexible impervious metallic sheet strip material having a thickness of between 0.015 and 0.125 inch, comprising a plurality of long strips of uniform thickness with their longitudinal edges disposed in parallel overlapping relation extending parallel to the center line of the landing runway, a bituminous sealing layer interposed between the said overlapping edges binding the strips together to form a continuous metallic membrane, and a base course for supporting the strips above a prepared smooth subgrade composed of earthy material having an optimum moisture content to make the base course load sustaining and having a thickness of between 6" and 36", and a smooth layer of bituminous sealing and binder material interposed between the top of the base course and the under surface of the metallic membrane in intimate contact throughout having a thickness between $\frac{1}{32}$" and $1\frac{1}{2}$" for supporting the metallic membrane above the subgrade, binding the strips forming the membrane together in fixed relation to each other and sealing the top of base course to retard a change in the moisture content of the said base course.

7. Structure as claimed in claim 6 including a layer of moisture impervious material interposed between the bottom of the base course and a prepared load supporting subgrade, to prevent the escape of the optimum moisture content of the base course from below.

References Cited in the file of this patent

UNITED STATES PATENTS

| | | |
|---|---|---|
| 1,277,936 | Innes | Sept. 3, 1918 |
| 1,569,702 | Brown | Jan. 12, 1926 |
| 1,705,160 | Stagg | Mar. 12, 1929 |
| 1,921,822 | Hines | Aug. 8, 1933 |
| 2,044,498 | Pearce | June 16, 1936 |
| 2,096,469 | Podolske | Oct. 19, 1937 |
| 2,211,649 | Drury | Aug. 13, 1940 |
| 2,344,131 | Coryell | Mar. 14, 1944 |

FOREIGN PATENTS

| | | |
|---|---|---|
| 407,433 | Great Britain | Mar. 22, 1934 |
| 423,498 | Great Britain | Feb. 4, 1935 |